United States Patent [19]
Anderson et al.

[11] 3,892,710
[45] *July 1, 1975

[54] ABS PLASTIC COMPOSITIONS CONTAINING HALOGENATED ARYL FLAME RETARDANTS

[75] Inventors: Arnold L. Anderson; Robert J. Nulph, both of Alma, Mich.

[73] Assignee: Michigan Chemical Corporation, St. Louis, Mich.

[ * ] Notice: The portion of the term of this patent subsequent to July 16, 1991, has been disclaimed.

[22] Filed: Feb. 8, 1973

[21] Appl. No.: 330,800

Related U.S. Application Data

[63] Continuation-in-part of Ser. No. 260,240, June 6, 1972, abandoned.

[52] U.S. Cl. ............ 260/45.9 R; 260/42; 260/42.22; 260/45.75 R; 260/45.95
[51] Int. Cl. ............................................. C08f 45/60
[58] Field of Search . 260/45.95 G, 2.5 AJ, 45.95 C, 260/45.9 R, 613 B, 33.2 R, 45.9 R, DIG. 24; 106/15 FP

[56] References Cited
UNITED STATES PATENTS

| | | | |
|---|---|---|---|
| 3,385,819 | 5/1968 | Gouinlock | 260/45.75 R |
| 3,560,441 | 2/1971 | Schwarcy et al. | 260/45.7 R |
| 3,658,634 | 4/1972 | Yanagi et al. | 161/403 |
| 3,717,609 | 2/1973 | Kutner | 260/45.95 G |

*Primary Examiner*—M. J. Welsh
*Attorney, Agent, or Firm*—Robert M. Phipps; James J. Mullen; Robert S. Frieman

[57] ABSTRACT

Plastic compositions containing acrylonitrile-butadiene-styrene and halogenated aryl compounds having the formula

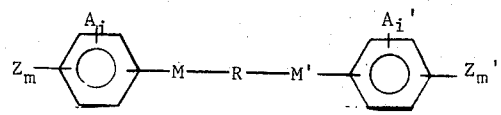

wherein Z is bromine or chlorine, $m$ and $m'$ are integers having a value of 1–5, $i$ and $i'$ are integers having a value of 0–2, R is herein defined, M and M' are each independent and are from the group oxygen, nitrogen or sulfur with the proviso that M and M' cannot concurrently be oxygen in both cases, and A is chlorine, cyano, nitro, lower alkoxy, lower alkyl, fluorine, dialkylamino, phenyl, halo-phenyl, benzyl, or halo-benzyl.

29 Claims, No Drawings

ABS PLASTIC COMPOSITIONS CONTAINING HALOGENATED ARYL FLAME RETARDANTS

This application is a continuation-in-part of copending application Ser. No. 260,240, filed June 6, 1972 and now abandoned. The entire specification of this case, Ser. No. 260,240, is to be considered as incorporated herein by reference.

The prior art considered in conjunction with the preparation of this application is as follows: U.S. Pat. Nos. 2,130,990; 2,186,367; 2,329,033; 3,666,692; 3,686,320; 3,658,634; German Pat. Nos. 1,139,636; German Pat. No. 2,054,522; Japanese Pat. No. (72) 14,500 as cited in Volume 77, Chemical Abstracts, column 153737k (1972); Chemical Abstracts, Volume 13, column 448[5]; Chemical Abstracts, Volume 31, column 7045[9]; and Journal of the Chemical Society, pages 2972–2976 (1963). All of these publications are to be considered as incorporated herein by reference.

The present invention relates to plastic compositions containing acrylonitrile-butadiene-styrene (herein referred to as ABS). More specifically, the present invention covers plastic compositions containing ABS and certain halogenated aryl compounds (hereinafter defined) as flame retardants for said plastic compositions.

ABS plastics and utility thereof are known in the art as exemplified by *ABS Plastics*, C. H. Basdekis, (Reinhold Plastics Applications Series), Reinhold Publishing Corporation, New York, 1964 and *Modern Plastics Encyclopedia* 1972–1973, Vol. 49: No. 10A, October, 1972, pages 10, 14, 16, 17, 19, 142 and 143 and which publications are in toto incorporated herein by reference.

The need for flame retarding ABS plastics has also been recognized in the art as exemplified by U.S. Pat. Nos. 3,422,048 and 3,418,263 and Modern Plastics Encyclopedia, ibid, pages 142, 143, 202, 203 and 456–458 and which publications are in toto incorporated herein by reference.

The resultant disadvantages in the utilization of various prior art materials as flame retardants for ABS include, without limitation, factors such as thermal migration, heat instability, light instability, non-biodegradable, toxicity, discoloration and the large amounts employed in order to be effective. Thus, there is always a demand for a material which will function as a flame retardant in ABS and concurrently will not, by incorporation therein, adversely effect the chemical and/or physical and/or mechanical properties of the resultant ABS plastic composition.

The prior art problem of providing a flame retarded ABS composition having desired chemical, physical and mechanical properties has now been substantially solved by the present invention and the above-described disadvantages substantially overcome.

Accordingly, one of the main objects of the present invention is to provide ABS plastic compositions which are flame retarded.

Another object of the present invention is to provide a material for ABS plastic compositions which will not substantially adversely effect the chemical and/or physical and/or mechanical properties of said compositions.

A further object of the present invention is to provide a flame retardant which is economic and easy to incorporate into ABS plastics without being degraded or decomposed as a result of blending or processing operations.

It has been found that the foregoing objects can be obtained by the incorporation of a new class of halogenated aryl compounds in ABS to subsequently provide flame retarded compositions which exhibit outstanding chemical, physical and mechanical properties.

The halogenated aryl compounds used in the present invention compositions have the formula:

(I) 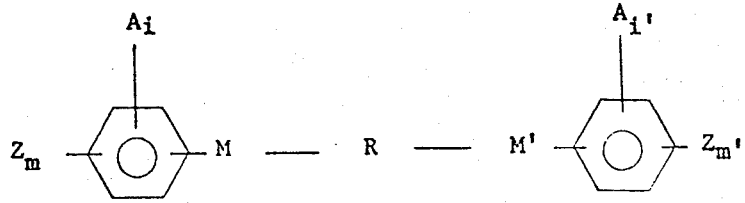

In Formula I above, Z is bromine or chlorine, $m$ and $m'$ are integers each independently having a value of 1–5; $i$ and $i'$ are integers each independently having a value of 0–2; M and M' are each independent and are from the group oxygen, nitrogen and sulfur with the proviso that M and M' cannot concurrently be oxygen in both cases and where M and/or M' is nitrogen, the formula is

A is from the group chlorine, cyano (—CN), nitro (—NO$_2$), lower alkoxy (e.g. —OCH$_3$, OC$_2$H$_5$), lower alkyl (e.g. CH$_3$, C$_2$H$_5$, C$_3$H$_4$, C$_4$H$_9$), fluorine, dialkyl-amino e.g. —N(CH$_3$)$_2$ N(C$_2$H$_5$)$_2$, phenyl (—C$_6$H$_5$), halo-phenyl, benzyl (—CH$_2$C$_6$H$_5$), and halo-benzyl; and R is from the group (a) alkylene: branched or straight or halo-branched chain group having from one to six carbon atoms (e.g. CH$_2$, C$_2$H$_4$, C$_3$H$_6$, C$_4$H$_8$, —C(CH$_3$)H—, —(CH$_3$)C(CH$_3$)—, —C(CH$_2$Cl)H—, —C(CHBr$_2$)H—).

(b) CH$_2$—CH(OH)—CH$_2$
(c) CH$_2$—CH(CH$_2$HO)—CH$_2$
(d) (CH$_2$)$_w$ —O— (CH$_2$)$_w$
where w = 1–6
(e)

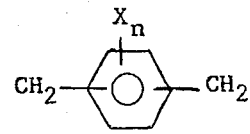

where
X = H, Cl, Br
n = 4

(f) CH₂—C(O)—CH₂

(g)

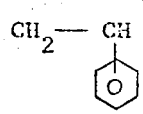

(h)

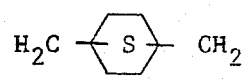

where S = saturated ring (I)

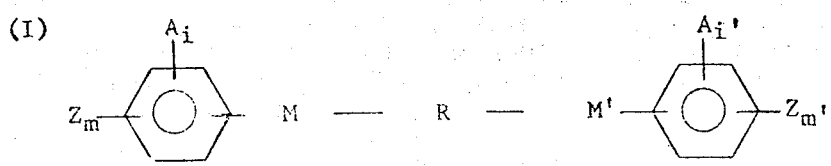

In Formula I, $i + m$ or $i' + m'$ is not greater than 5.

It is to be understood that all of the compounds falling within the above Formula I and as heretofore defined are generically described herein as "halogenated aryl" compounds.

The halogenated aryl compounds are found to be compatible with and effective additives for various polymeric systems to make the resultant polymer flame retardant.

Illustrative (but without limitation) of some of the present invention halogenated aryl compounds are shown below:

the exemplary definitions of A, Z, M, M', R, $m$, $m'$, $i$ and $i'$ are listed in Table I.

Table I

| Compound No. | Z | m | m' | A | i | j' | R | M | M' |
|---|---|---|---|---|---|---|---|---|---|
| 1 | Br | 1 | 1 | — | 0 | 0 | C₂H₄ | S | S |
| 2 | Br | 1 | 3 | — | 0 | 0 | C₂H₄ | S | O |
| 3 | Br | 2 | 2 | Cl | 1 | 1 | C₃H₆ | O | N |
| 4 | Br | 2 | 2 | —CN | 1 | 1 | C₂H₄ | N | N |
| 5 | Br | 2 | 2 | —NO₂ | 1 | 1 | C₂H₄ | O | N |
| 6 | Cl | 2 | 2 | —OCH₃ | 1 | 1 | C₂H₄ | S | S |
| 7 | Br | 3 | 3 | —OCH₃ | 1 | 1 | C₂H₄ | S | O |
| 8 | Br | 2 | 2 | —CH₃ | 1 | 1 | C₂H₄ | N | N |
| 9 | Br | 2 | 2 | F | 1 | 1 | C₃H₆ | S | S |
| 10 | Br | 2 | 2 | —N(CH₃)₂ | 1 | 1 | C₂H₄ | N | N |
| 11 | Br | 2 | 2 | —C₆H₅ | 1 | 1 | C₂H₄ | N | S |
| 12 | Cl | 2 | 2 | —C₆H₃Br₂ | 1 | 1 | C₂H₄ | N | S |
| 13 | Br | 2 | 2 | —CH₂C₆H₅ | 1 | 1 | C₂H₄ | N | S |
| 14 | Br | 2 | 2 | —CH₂C₆H₃Br₂ | 1 | 1 | C₂H₄ | N | N |
| 15 | Cl | 3 | 3 | —C₆H₃Cl₂ | 1 | 1 | C₃H₆ | N | N |
| 16 | Br | 3 | 3 | F | 1 | 1 | C₆H₁₂ | N | O |
| 17 | Br | 2 | 1 | —N(CH₃)₂ | 1 | 0 | C₃H₆ | N | S |
| 18 | Br | 2 | 3 | —N(CH₃)₂ | 1 | 0 | C₃H₆ | N | O |
| 19 | Cl | 3 | 3 | —C₆H₂Br₃ | 1 | 1 | C₃H₄ | S | S |
| 20 | Br | 3 | 3 | Cl | 2 | 2 | C₃H₆ | S | N |
| 21 | Br | 2 | 2 | Cl | 1 | 1 | CH(CH₃)CH₂ | N | N |
| 22 | Br | 4 | 4 | Cl | 1 | 1 | CH(CH₃)CH₂CH₂ | S | O |
| 23 | Br | 3 | 3 | F | 2 | 2 | CH₂CH(CH₃)CH₂CH₂ | O | N |
| 24 | Br | 1 | 1 | —C₄H₉ | 1 | 1 | CH₂ | N | N |
| 25 | Br | 1 | 1 | —OC₄H₉ | 1 | 1 | C₂H₄ | N | O |
| 26 | Br | 3 | 3 | — | 0 | 0 | CH₂C(CH₂Cl)H | N | N |
| 27 | Br | 3 | 3 | — | 0 | 0 | CH₂C(CH₂Cl)₂ | N | S |
| 28 | Br | 5 | 5 | — | 0 | 0 | CH₂C(CH₂Cl)H | S | N |
| 29 | Br | 2 | 2 | —CN | 1 | 1 | CH₂CH₂C(CH₂Br)H | S | O |
| 30 | Br | 2 | 2 | —NO₂ | 1 | 1 | CH₂(CHCl₂)H | O | N |
| 31 | Cl | 2 | 2 | —OCH₃ | 1 | 1 | CH₂C(CH₂Cl)H | N | N |
| 32 | Br | 3 | 3 | —OCH₃ | 1 | 1 | (CH₂)₃C(CH₂Cl)₂ | O | N |
| 33 | Br | 2 | 2 | —CH₃ | 1 | 1 | CH₂C(CH₂Cl)H | S | S |
| 34 | Br | 2 | 2 | F | 1 | 1 | CH₂C(CH₂Cl)₂ | S | O |
| 35 | Br | 2 | 2 | —N(CH₃)₂ | 1 | 1 | CH₂C(CHBr₂)H | N | N |
| 36 | Br | 2 | 2 | —C₆H₅ | 1 | 1 | (CH₂)₂C(CBr₃)H | S | S |
| 37 | Cl | 2 | 2 | —C₆H₃Br₂ | 1 | 1 | CH₂C(CH₂Cl)H | N | N |
| 38 | Br | 2 | 2 | —CH₂C₆H₅ | 1 | 1 | CH₂C(CCl₃)₂ | N | S |
| 39 | Br | 2 | 2 | —CH₂C₆H₃Br₂ | 1 | 1 | CH₂C(CH₂Cl)H | S | S |
| 40 | Cl | 3 | 3 | —C₆H₃Cl₂ | 1 | 1 | CH₂C(CH₂Cl)H | S | S |
| 41 | Br | 3 | 3 | F | 1 | 1 | CH₂C(CCl₃)₂ | N | N |
| 42 | Cl | 5 | 5 | — | 0 | 0 | CH₂C(CH₂Cl)H | N | O |
| 43 | Br | 4 | 4 | — | 0 | 0 | CH₂C(CH₂Cl)H | N | S |
| 44 | Br | 3 | 3 | —C₆H₂Br₃ | 1 | 1 | (CH₂)₃C(CH₂Cl)₂ | O | N |
| 45 | Br | 3 | 3 | — | 0 | 0 | CH₂C(CH₂Cl)HCH₂ | S | S |
| 46 | Br | 2 | 2 | — | 0 | 0 | CH₂C(CCl₃)H | N | S |
| 47 | Br | 4 | 4 | — | 0 | 0 | CH₂C(CHBr₂)H | N | N |
| 48 | Br | 3 | 3 | F | 2 | 2 | CH₂C(CH₂Cl)H | O | S |
| 49 | Br | 1 | 1 | —C₄H₉ | 1 | 1 | CH₂C(CH₂Cl)H | N | O |
| 50 | Br | 1 | 1 | —OCH₄H₉ | 1 | 1 | (CH₂)₃C(CH₂Cl)H | N | N |
| 51 | Br | 2 | 2 | — | 0 | 0 | CH₂CH(OH)CH₂ | S | S |
| 52 | Br | 3 | 3 | — | 0 | 0 | CH₂CH(OH)CH₂ | N | N |
| 53 | Cl | 2 | 2 | — | 0 | 0 | CH₂CH(OH)CH₂ | S | N |

Table I – Continued

| Compound No. | Z | m | m' | A | i | j' | R | M | M' |
|---|---|---|---|---|---|---|---|---|---|
| 54 | Br | 2 | 2 | —CN | 1 | 1 | $CH_2CH(OH)CH_2$ | S | O |
| 55 | Br | 2 | 2 | —$NO_2$ | 1 | 1 | $CH_2CH(OH)CH_2$ | O | N |
| 56 | Br | 2 | 2 | —$OCH_3$ | 1 | 1 | $CH_2CH(OH)CH_2$ | N | S |
| 57 | Br | 3 | 3 | —$OCH_3$ | 1 | 1 | $CH_2CH(OH)CH_2$ | N | O |
| 58 | Br | 2 | 2 | —$CH_3$ | 1 | 1 | $CH_2CH(OH)CH_2$ | S | N |
| 59 | Br | 2 | 2 | F | 1 | 1 | $CH_2CH(OH)CH_2$ | O | S |
| 60 | Br | 2 | 2 | —$N(CH_3)_2$ | 1 | 1 | $CH_2CH(OH)CH_2$ | N | N |
| 61 | Br | 2 | 2 | —$C_6H_5$ | 1 | 1 | $CH_2CH(OH)CH_2$ | S | N |
| 62 | Br | 2 | 2 | —$C_6H_3Br_2$ | 1 | 1 | $CH_2CH(OH)CH_2$ | N | S |
| 63 | Br | 2 | 2 | —$CH_2C_6H_5$ | 1 | 1 | $CH_2CH(OH)CH_2$ | S | N |
| 64 | Br | 2 | 2 | —$CH_2C_6H_3Br_2$ | 1 | 1 | $CH_2CH(OH)CH_2$ | N | S |
| 65 | Br | 3 | 3 | —$C_6H_3Cl_2$ | 1 | 1 | $CH_2CH(OH)CH_2$ | S | S |
| 66 | Cl | 3 | 3 | F | 1 | 1 | $CH_2CH(OH)CH_2$ | S | O |
| 67 | Cl | 2 | 2 | —CN | 2 | 2 | $CH_2CH(OH)CH_2$ | N | N |
| 68 | Br | 4 | 4 | — | 0 | 0 | $CH_2CH(OH)CH_2$ | S | S |
| 69 | Cl | 3 | 3 | —$C_6H_2Br_3$ | 1 | 1 | $CH_2CH(OH)CH_2$ | N | O |
| 70 | Cl | 3 | 3 | —$NO_2$ | 2 | 2 | $CH_2CH(OH)CH_2$ | S | S |
| 71 | Cl | 2 | 2 | —$OCH_3$ | 1 | 1 | $CH_2CH(OH)CH_2$ | N | O |
| 72 | Cl | 4 | 4 | —$CH_3$ | 1 | 1 | $CH_2CH(OH)CH_2$ | S | N |
| 73 | Cl | 3 | 3 | F | 2 | 2 | $CH_2CH(OH)CH_2$ | N | N |
| 74 | Br | 1 | 1 | —$C_4H_9$ | 1 | 1 | $CH_2CH(OH)CH_2$ | O | N |
| 75 | Br | 1 | 1 | —$OC_4H_9$ | 1 | 1 | $CH_2CH(OH)CH_2$ | N | N |
| 76 | Br | 2 | 2 | — | 0 | 0 | $CH_2CH(CH_2OH)CH_2$ | S | N |
| 77 | Br | 3 | 3 | — | 0 | 0 | $CH_2CH(CH_2OH)CH_2$ | S | S |
| 78 | Cl | 2 | 2 | — | 0 | 0 | $CH_2CH(CH_2OH)CH_2$ | S | O |
| 79 | Br | 2 | 2 | —CN | 1 | 1 | $CH_2CH(CH_2OH)CH_2$ | N | N |
| 80 | Br | 2 | 2 | —$NO_2$ | 1 | 1 | $CH_2CH(CH_2OH)CH_2$ | O | S |
| 81 | Br | 2 | 2 | —$OCH_3$ | 1 | 1 | $CH_2CH(CH_2OH)CH_2$ | S | S |
| 82 | Br | 3 | 3 | —$OCH_3$ | 1 | 1 | $CH_2CH(CH_2OH)CH_2$ | S | O |
| 83 | Br | 2 | 2 | —$CH_3$ | 1 | 1 | $CH_2CH(CH_2OH)CH_2$ | N | N |
| 84 | Br | 2 | 2 | F | 1 | 1 | $CH_2CH(CH_2OH)CH_2$ | S | S |
| 85 | Br | 2 | 2 | —$N(CH_3)_2$ | 1 | 1 | $CH_2CH(CH_2OH)CH_2$ | N | N |
| 86 | Br | 2 | 2 | —$C_6H_5$ | 1 | 1 | $CH_2CH(CH_2OH)CH_2$ | N | S |
| 87 | Br | 2 | 2 | —$C_6H_3Br_2$ | 1 | 1 | $CH_2CH(CH_2OH)CH_2$ | S | S |
| 88 | Br | 2 | 2 | —$CH_2C_6H_5$ | 1 | 1 | $CH_2CH(CH_2OH)CH_2$ | S | N |
| 89 | Br | 2 | 2 | —$CH_2C_6H_3Br_2$ | 1 | 1 | $CH_2CH(CH_2OH)CH_2$ | N | N |
| 90 | Br | 3 | 3 | —$C_6H_3Cl_2$ | 1 | 1 | $CH_2CH(CH_2OH)CH_2$ | N | N |
| 91 | Cl | 3 | 3 | F | 1 | 1 | $CH_2CH(CH_2OH)CH_2$ | O | N |
| 92 | Cl | 2 | 2 | —CN | 2 | 2 | $CH_2CH(CH_2OH)CH_2$ | S | N |
| 93 | Br | 4 | 4 | — | 0 | 0 | $CH_2CH(CH_2OH)CH_2$ | O | S |
| 94 | Cl | 3 | 3 | —$C_6H_2Br_3$ | 1 | 1 | $CH_2CH(CH_2OH)CH_2$ | S | N |
| 95 | Cl | 3 | 3 | —$NO_2$ | 2 | 2 | $CH_2CH(CH_2OH)CH_2$ | N | S |
| 96 | Cl | 2 | 2 | —$OCH_3$ | 1 | 1 | $CH_2CH(CH_2OH)CH_2$ | N | N |
| 97 | Cl | 4 | 4 | —$CH_3$ | 1 | 1 | $CH_2CH(CH_2OH)CH_2$ | O | S |
| 98 | Cl | 3 | 3 | F | 2 | 2 | $CH_2CH(CH_2OH)CH_2$ | N | O |
| 99 | Br | 1 | 1 | —$C_4H_9$ | 1 | 1 | $CH_2CH(CH_2OH)CH_2$ | N | N |
| 100 | Br | 1 | 1 | —$OC_4H_9$ | 1 | 1 | $CH_2CH(CH_2OH)CH_2$ | O | N |
| 101 | Br | 2 | 2 | — | 0 | 0 | $CH_2OCH_2$ | N | N |
| 102 | Br | 3 | 3 | — | 0 | 0 | $CH_2OCH_2$ | S | S |
| 103 | Cl | 2 | 2 | — | 0 | 0 | $(CH_2)_6O(CH_2)_6$ | S | N |
| 104 | Br | 2 | 2 | —CN | 1 | 1 | $(CH_2)_2O(CH_2)_2$ | S | O |
| 105 | Br | 2 | 2 | —$NO_2$ | 1 | 1 | $CH_2OCH_2$ | O | N |
| 106 | Br | 2 | 2 | —$OCH_3$ | 1 | 1 | $(CH_2)_3O(CH_2)_3$ | N | N |
| 107 | Br | 3 | 3 | —$OCH_3$ | 1 | 1 | $(CH_2)_5O(CH_2)_5$ | N | O |
| 108 | Br | 2 | 2 | —$CH_3$ | 1 | 1 | $CH_2OCH_2$ | S | S |
| 109 | Br | 2 | 2 | F | 1 | 1 | $CH_2OCH_2$ | N | S |
| 110 | Br | 2 | 2 | —$N(CH_3)_2$ | 1 | 1 | $CH_2OCH_2$ | O | N |
| 111 | Br | 2 | 2 | —$C_6H_5$ | 1 | 1 | $CH_2OCH_2$ | S | N |
| 112 | Br | 2 | 2 | —$C_6H_3Br_2$ | 1 | 1 | $(CH_2)_4O(CH_2)_4$ | N | N |
| 113 | Br | 2 | 2 | —$CH_2C_6H_5$ | 1 | 1 | $CH_2OCH_2$ | S | S |
| 114 | Br | 2 | 2 | —$CH_2C_6H_3Br_2$ | 1 | 1 | $(CH_2)_3O(CH_2)_3$ | N | S |
| 115 | Br | 3 | 3 | —$C_6H_3Cl_2$ | 1 | 1 | $CH_2OCH_2$ | S | N |
| 116 | Cl | 3 | 3 | F | 1 | 1 | $CH_2OCH_2$ | S | N |
| 117 | Cl | 2 | 2 | —CN | 2 | 2 | $CH_2OCH_2$ | O | N |
| 118 | Br | 4 | 4 | — | 0 | 0 | $(CH_2)_2OCH_2$ | S | S |
| 119 | Cl | 3 | 3 | —$C_6H_2Br_3$ | 1 | 1 | $CH_2OCH_2$ | S | O |
| 120 | Cl | 3 | 3 | —$NO_2$ | 2 | 2 | $(CH_2)_2O(CH_2)_2$ | N | S |
| 121 | Cl | 2 | 2 | —$OCH_3$ | 1 | 1 | $CH_2OCH_2$ | N | N |
| 122 | Cl | 4 | 4 | —$CH_3$ | 1 | 1 | $CH_2OCH_2$ | S | N |
| 123 | Cl | 3 | 3 | F | 2 | 2 | $CH_2OCH_2$ | N | O |
| 124 | Br | 1 | 1 | —$C_4H_9$ | 1 | 1 | $CH_2OCH_2$ | O | N |
| 125 | Br | 1 | 1 | —$OC_4H_9$ | 1 | 1 | $CH_2OCH_2$ | N | N |
| 126 | Br | 2 | 2 | — | 0 | 0 | $CH_2(C_6H_4)CH_2$ | S | N |
| 127 | Br | 3 | 3 | — | 0 | 0 | $CH_2(C_6H_2Br_2)CH_2$ | S | S |
| 128 | Cl | 2 | 2 | — | 0 | 0 | $CH_2(C_6H_2Cl_2)CH_2$ | O | S |
| 129 | Br | 3 | 3 | —CN | 1 | 1 | $CH_2(C_6Br_4)CH_2$ | O | N |
| 130 | Br | 2 | 2 | —$NO_2$ | 1 | 1 | $CH_2(C_6Cl_4)CH_2$ | N | O |
| 131 | Br | 2 | 2 | —$OCH_3$ | 1 | 1 | $CH_2(C_6H_4)CH_2$ | S | S |
| 132 | Br | 3 | 3 | —$OCH_3$ | 1 | 1 | $CH_2(C_6HBr_3)CH_2$ | O | S |
| 133 | Br | 2 | 2 | —$CH_3$ | 1 | 1 | $CH_2(C_6H_2Br_2)CH_2$ | N | N |
| 134 | Br | 2 | 2 | F | 1 | 1 | $CH_2(C_6Br_4)CH_2$ | S | N |
| 135 | Br | 2 | 2 | —$N(CH_3)_2$ | 1 | 1 | $CH_2(C_6HBr_3)CH_2$ | S | N |
| 136 | Br | 2 | 2 | —$C_6H_5$ | 1 | 1 | $CH_2(C_6H_4)CH_2$ | S | N |
| 137 | Br | 2 | 2 | —$C_6H_3Br_2$ | 1 | 1 | $CH_2(C_6H_4)CH_2$ | S | S |
| 138 | Br | 2 | 2 | —$CH_2C_6H_5$ | 1 | 1 | $CH_2(C_6H_2Br_2)CH_2$ | S | S |
| 139 | Br | 2 | 2 | —$CH_2C_6H_3Br_2$ | 1 | 1 | $CH_2(C_6HBr_3)CH_2$ | N | N |
| 140 | Br | 3 | 3 | —$C_6H_3Cl_2$ | 1 | 1 | $CH_2(C_6Cl_4)CH_2$ | N | S |
| 141 | Cl | 3 | 3 | F | 1 | 1 | $CH_2(C_6H_4)CH_2$ | N | O |
| 142 | Cl | 2 | 2 | —CN | 2 | 2 | $CH_2(C_6HBr_3)CH_2$ | S | N |
| 143 | Br | 4 | 4 | — | 0 | 0 | $CH_2(C_6H_4)CH_2$ | S | S |
| 144 | Cl | 3 | 3 | —$C_6H_2Br_3$ | 1 | 1 | $CH_2(C_6Br_4)CH_2$ | N | S |
| 145 | Cl | 3 | 3 | —$NO_2$ | 2 | 2 | $CH_2(C_6H_4)CH_2$ | S | N |

Table I—Continued

| Compound No. | Z | m | m' | A | i | j' | R | | | M | M' |
|---|---|---|---|---|---|---|---|---|---|---|---|
| 146 | Cl | 2 | 2 | —OCH₃ | 1 | 1 | CH₂(C₆H₄)CH₂ | | | N | N |
| 147 | Cl | 4 | 4 | —CH₃ | 1 | 1 | CH₂(C₆H₄)CH₂ | | | S | O |
| 148 | Cl | 3 | 3 | F | 2 | 2 | CH₂(C₆H₄)CH₂ | | | O | N |
| 149 | Br | 1 | 1 | —C₄H₉ | 1 | 1 | CH₂(C₆Br₄)CH₂ | | | N | N |
| 150 | Br | 1 | 1 | —OC₄H₉ | 1 | 1 | CH₂(C₆Br₄)CH₂ | | | O | N |
| 151 | Br | 2 | 2 | — | 0 | 0 | CH₂—C(O)—CH₂ | | | N | N |
| 152 | Br | 2 | 2 | — | 0 | 0 | CH₂—C(O)—CH₂ | | | S | S |
| 153 | Cl | 2 | 2 | — | 0 | 0 | CH₂—C(O)—CH₂ | | | N | S |
| 154 | Br | 2 | 2 | —CN | 1 | 1 | CH₂—C(O)—CH₂ | | | O | O |
| 155 | Br | 2 | 2 | —NO₂ | 1 | 1 | CH₂—C(O)—CH₂ | | | N | N |
| 156 | Br | 2 | 2 | —OCH₃ | 1 | 1 | CH₂—C(O)—CH₂ | | | N | O |
| 157 | Br | 3 | 3 | —OCH₃ | 1 | 1 | CH₂—C(O)—CH₂ | | | N | S |
| 158 | Br | 2 | 2 | —CH₃ | 1 | 1 | CH₂—C(O)—CH₂ | | | S | S |
| 159 | Br | 2 | 2 | F | 1 | 1 | CH₂—C(O)—CH₂ | | | O | N |
| 160 | Br | 2 | 2 | —N(CH₃)₂ | 1 | 1 | CH₂—C(O)—CH₂ | | | S | S |
| 161 | Br | 2 | 2 | —C₆H₅ | 1 | 1 | CH₂—C(O)—CH₂ | | | N | N |
| 162 | Br | 2 | 2 | —C₆H₃Br₂ | 1 | 1 | CH₂—C(O)—CH₂ | | | N | S |
| 163 | Br | 2 | 2 | —CH₂C₆H₅ | 1 | 1 | CH₂—C(O)—CH₂ | | | N | S |
| 164 | Br | 2 | 2 | —CH₂C₆H₃Br₂ | 1 | 1 | CH₂—C(O)—CH₂ | | | S | S |
| 165 | Br | 3 | 3 | —C₆H₃Cl₂ | 1 | 1 | CH₂—C(O)—CH₂ | | | N | N |
| 166 | Cl | 3 | 3 | F | 1 | 1 | CH₂—C(O)—CH₂ | | | O | N |
| 167 | Cl | 2 | 2 | —CN | 2 | 2 | CH₂—C(O)—CH₂ | | | N | S |
| 168 | Br | 4 | 4 | — | 0 | 0 | CH₂—C(O)—CH₂ | | | S | N |
| 169 | Cl | 3 | 3 | —C₆H₂Br₃ | 1 | 1 | CH₂—C(O)—CH₂ | | | N | O |
| 170 | Cl | 3 | 3 | —NO₂ | 2 | 2 | CH₂—C(O)—CH₂ | | | O | S |
| 171 | Cl | 2 | 2 | —OCH₃ | 1 | 1 | CH₂—C(O)—CH₂ | | | N | N |
| 172 | Cl | 4 | 4 | —CN | 1 | 1 | CH₂—C(O)—CH₂ | | | N | O |
| 173 | Cl | 3 | 3 | F | 2 | 2 | CH₂—C(O)—CH₂ | | | S | N |
| 174 | Br | 1 | 1 | —C₄H₉ | 1 | 1 | CH₂—C(O)—CH₂ | | | O | N |
| 175 | Br | 1 | 1 | —OC₄H₉ | 1 | 1 | CH₂—C(O)—CH₂ | | | N | N |
| 176 | Br | 2 | 2 | — | 0 | 0 | —CH₂C(C₆H₅)H— | | | N | O |
| 177 | Br | 2 | 2 | — | 0 | 0 | —CH₂C(C₆H₅)H— | | | N | O |
| 178 | Cl | 2 | 2 | — | 0 | 0 | —CH₂C(C₆H₅)H— | | | S | N |
| 179 | Br | 2 | 2 | —CN | 1 | 1 | —CH₂C(C₆H₅)H— | | | N | N |
| 180 | Br | 2 | 2 | —NO₂ | 1 | 1 | —CH₂C(C₆H₅)H— | | | S | S |
| 181 | Br | 2 | 2 | —OCH₃ | 1 | 1 | —CH₂C(C₆H₅)H— | | | S | N |
| 182 | Br | 3 | 3 | —OCH₃ | 1 | 1 | —CH₂C(C₆H₅)H— | | | O | N |
| 183 | Br | 2 | 2 | —CH₃ | 1 | 1 | —CH₂C(C₆H₅)H— | | | S | S |
| 184 | Br | 2 | 2 | F | 1 | 1 | —CH₂C(C₆H₅)H— | | | N | O |
| 185 | Br | 2 | 2 | —N(CH₃)₂ | 1 | 1 | —CH₂C(C₆H₅)H— | | | N | S |
| 186 | Br | 2 | 2 | —C₆H₅ | 1 | 1 | —CH₂C(C₆H₅)H— | | | S | N |
| 187 | Br | 2 | 2 | —C₆H₃Br₂ | 1 | 1 | —CH₂C(C₆H₅)H— | | | S | N |
| 188 | Br | 2 | 2 | —CH₂C₆H₅ | 1 | 1 | —CH₂C(C₆H₅)H— | | | S | N |
| 189 | Br | 2 | 2 | —CH₂C₆H₃Br₂ | 1 | 1 | —CH₂C(C₆H₅)H— | | | N | N |
| 190 | Br | 3 | 3 | —C₆H₃Cl₂ | 1 | 1 | —CH₂C(C₆H₅)H— | | | S | S |
| 191 | Cl | 3 | 3 | F | 1 | 1 | —CH₂C(C₆H₅)H— | | | N | O |
| 192 | Cl | 2 | 2 | —CN | 2 | 2 | —CH₂C(C₆H₅)H— | | | S | S |
| 193 | Br | 4 | 4 | — | 0 | 0 | —CH₂C(C₆H₅)H— | | | S | N |
| 194 | Cl | 3 | 3 | —C₆H₂Br₃ | 1 | 1 | —CH₂C(C₆H₅)H— | | | O | N |
| 195 | Cl | 3 | 3 | —NO₂ | 2 | 2 | —CH₂C(C₆H₅)H— | | | N | N |
| 196 | Cl | 2 | 2 | —OCH₃ | 1 | 1 | —CH₂C(C₆H₅)H— | | | O | N |
| 197 | Cl | 4 | 4 | —CH₃ | 1 | 1 | —CH₂C(C₆H₅)H— | | | S | O |
| 198 | Cl | 3 | 3 | F | 2 | 2 | —CH₂C(C₆H₅)H— | | | S | N |
| 199 | Br | 1 | 1 | —C₄H₉ | 1 | 1 | —CH₂C(C₆H₅)H— | | | S | S |
| 200 | Br | 1 | 1 | —OC₄H₉ | 1 | 1 | —CH₂C(C₆H₅)H— | | | N | N |
| 201 | Br | 2 | 2 | — | 0 | 0 | H₂C |  | CH₂ | N | N |
| 202 | Br | 2 | 2 | — | 0 | 0 | H₂C |  | CH₂ | S | S |
| 203 | Cl | 2 | 2 | — | 0 | 0 | H₂C |  | CH₂ | N | S |
| 204 | Br | 2 | 2 | —CN | 1 | 1 | H₂C |  | CH₂ | S | O |
| 205 | Br | 2 | 2 | —NO₂ | 1 | 1 | H₂C |  | CH₂ | O | N |
| 206 | Br | 2 | 2 | —OCH₃ | 1 | 1 | H₂C |  | CH₂ | N | N |
| 207 | Br | 3 | 3 | —OCH₃ | 1 | 1 | H₂C |  | CH₂ | O | N |
| 208 | Br | 2 | 2 | —CH₃ | 1 | 1 | H₂C |  | CH₂ | S | S |
| 209 | Br | 2 | 2 | F | 1 | 1 | H₂C |  | CH₂ | O | S |
| 210 | Br | 2 | 2 | —N(CH₃)₂ | 1 | 1 | H₂C |  | CH₂ | N | N |
| 211 | Br | 2 | 2 | —C₆H₅ | 1 | 1 | H₂C |  | CH₂ | S | S |
| 212 | Br | 2 | 2 | —C₆H₃Br₂ | 1 | 1 | H₂C |  | CH₂ | N | N |
| 213 | Br | 2 | 2 | —CH₂C₆H₅ | 1 | 1 | H₂C |  | CH₂ | N | S |
| 214 | Br | 2 | 2 | —CH₂C₆H₃Br₂ | 1 | 1 | H₂C |  | CH₂ | N | S |
| 215 | Br | 3 | 3 | —C₆H₃Cl₂ | 1 | 1 | H₂C |  | CH₂ | S | S |

Table I—Continued

| Compound No. | Z | m | m' | A | i | j' | R | | M | M' |
|---|---|---|---|---|---|---|---|---|---|---|
| 216 | Cl | 3 | 3 | F | 1 | 1 | $H_2C$ | —⟨S⟩— | $CH_2$ | N | N |
| 217 | Cl | 2 | 2 | —CN | 2 | 2 | $H_2C$ | —⟨S⟩— | $CH_2$ | N | O |
| 218 | Br | 4 | 4 | — | 0 | 0 | $H_2C$ | —⟨S⟩— | $CH_2$ | N | S |
| 219 | Cl | 3 | 3 | —$C_6H_2Br_3$ | 1 | 1 | $H_2C$ | —⟨S⟩— | $CH_2$ | O | N |
| 220 | Cl | 3 | 3 | —$NO_2$ | 2 | 2 | $H_2C$ | —⟨S⟩— | $CH_2$ | S | S |
| 221 | Cl | 2 | 2 | —$OCH_3$ | 1 | 1 | $H_2C$ | —⟨S⟩— | $CH_2$ | S | N |
| 222 | Cl | 4 | 4 | —$CH_3$ | 1 | 1 | $H_2C$ | —⟨S⟩— | $CH_2$ | N | N |
| 223 | Cl | 3 | 3 | F | 2 | 2 | $H_2C$ | —⟨S⟩— | $CH_2$ | O | S |
| 224 | Br | 1 | 1 | —$C_4H_9$ | 1 | 1 | $H_2C$ | —⟨S⟩— | $CH_2$ | N | O |
| 225 | Br | 1 | 1 | —$OC_4H_9$ | 1 | 1 | $H_2C$ | —⟨S⟩— | $CH_2$ | N | N |

In general, the halogenated aryl compounds are prepared by reacting a halogenated phenol, thiophenol or aryl amine with a halogenated alkane at elevated temperatures in the presence of a basic material such as alkali metal hydroxides, carbonates, bicarbonates, oxides and hydrides. The preferred alkali metals are potassium and sodium. Where one desires to increase, for example, ease of handling the reaction mass, solvents such as ketones (e.g. acetone, methyl ethyl ketone, and methyl iso-butyl ketone), alcohols (e.g. methanol, ethanol, iso-propyl alcohol, butyl alcohol and glycols), aqueous solvents (e.g. water, a mixture of water and alcohol and a mixture of water and ketone), and polar aprotic solvents such as dimethylformamide (DMF), dimethyl sulfoxide (DMSO) and ethers such as tetrahydrofuran (THF), can be employed. The desired end product i.e. the halogenated aryl compound, can be recovered from the reaction mass via various methods such as distillation or crystallization. Where the end product requires recovery via crystallization, various aromatic solvents such as benzene, toluene, xylene, dichlorobenzene and the like can be used.

Specifically, the symmetrical halogenated aryl compounds are prepared, for example, according to the following reactions:

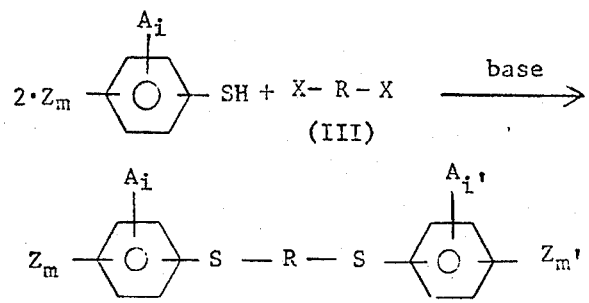

In the above reaction, X is halogen, preferably chlorine and R is the same as defined herein. Where m and m' and i and i' are different integers, then equivalent molar portions of the particular halogenated phenol, thiophenol or aryl amine are used with equivalent portions of dissimilar halogenated phenol, thiophenol or aryl amine.

The unsymmetrical halogenated aryl compounds are prepared, for example, according to the following reactions:

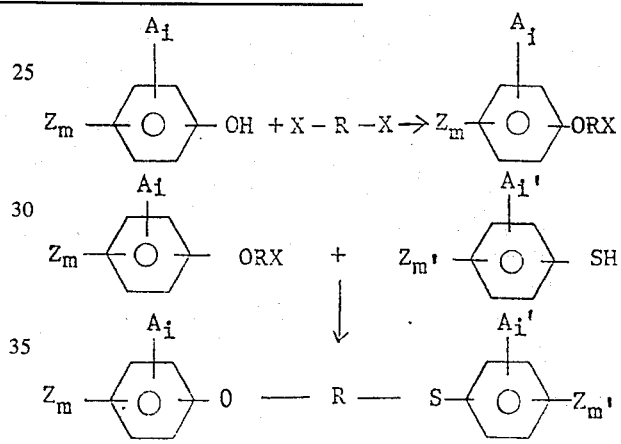

In the above reaction, X and R are the same as mentioned above.

The above reactions are conducted at temperatures ranging from the freezing point of the initial reaction mass to the boiling point thereof. Preferably the temperatures are from about 40° to about 200° C and more preferably from about 50° to about 175° C. It is to be understood that the reaction can be conducted under sub-atmospheric (e.g. 1/10–8/10 atmospheres), atmospheric or super-atmospheric (e.g. 1.5–10 atmospheres) pressure. Preferably, the reaction is carried out at atmospheric pressure.

The above-described processes can be carried out with conventional, readily available chemical processing equipment. For example, a conventional glass-lined vessel provided with heat transfer means, a reflux condenser and a mechanical stirrer can be advantageously utilized in practicing any of the preferred embodiments of the invention described in the examples set forth herein. The above described processes and resultant products, i.e., the halogenated aryl compounds, are more fully described in the present applicants' copending patent application Ser. No. 330,838 filed Feb. 8, 1973 and which is incorporated herein by reference.

The amount of halogenated aryl compound employed in the present invention compositions is any quantity which will effectively render the acrylonitrile-butadiene-styrene containing composition flame retardant. In general, the amount used is from about 1 to 25% by weight, based on the total weight of the composition. Preferably, the amount employed is from about 5 to about 20% by weight. It is to be understood that any amount can be used as long as it does not substantially adversely effect the chemical and/or physical and/or mechanical properties of the end polymer composition. The amount utilized, however, is such amount which achieves the objectives described herein.

It is to be understood that the term ABS as used herein means acrylonitrile-butadiene-styrene copolymers which are thermoplastic polymers produced, for example (but without limitation), by blending a styrene/acrylonitrile copolymer with butadiene-based rubber, or by grafting butadiene-based rubber (usually polybutadiene) with styrene/acrylonitrile chains, or by copolymerization of styrene, acrylonitrile and butadiene monomers.

Thus the acrylonitrile-butadiene-styrene used in the present invention compositions is any acrylonitrile-butadiene-styrene herein defined and which one so desires to flame retard. It is to be understood that the acrylonitrile-butadiene-styrene used can be a "virgin" material, i.e. substantially free of additives such as stabilizers, plasticizers, dyes, pigments, fillers, and the like, or the acrylonitrile-butadiene-styrene can have additives (such as those mentioned and described herein) already contained therein or added concurrently with or after the addition of the halogenated aryl compounds.

Another facet of the present invention relates to the use of certain metal compounds with the halogenated aryl compounds to promote a cooperative effect therebetween and thus enhance the flame retardancy of the resultant plastic composition as compared to the flame retardancy of either one component used separately. These "enhancing agents" are from the group antimony, arsenic, bismuth, tin and zinc-containing compounds. Without limitation, examples of said enhancing agents include $Sb_2O_3$, $SbCl_3$, $SbBr_3$, $SbI_3$, $SbOCl$, $As_2O_3$, $As_2O_5$, $ZnBO_4$, $BaB_2O_4.H_2O$, $2.ZnO.3B_2O_3.3.5-H_2O$ and stannous oxide hydrate. The preferred enhancing agent is antimony trioxide.

The amount of enhancing agent employed in the present invention compositions is any amount which when used with said halogenated aryl compounds will promote a cooperative effect therebetween. In general, the amount employed is from about 1 to about 15%, preferably from about 2 to about 10%, by weight, based on the total weight of plastic composition. Higher amounts can be used as long as the desired end result is achieved.

It is also within the scope of the present invention to employ other materials in the present invention compositions where one so desires to achieve a particular end result. Such materials include, without limitation, adhesion promotors; antioxidants; antistatic agents; antimicrobials; colorants; flame retardants such as those listed on pages 456-458, Modern Plastics Encyclopedia, ibid, (in addition to the new class of flame retardants described herein); heat stabilizers; light stabilizers; pigments; plasticizers; preservatives; ultraviolet stabilizers and fillers.

In this latter category, i.e. fillers, there can be mentioned without limitation, materials such as glass; carbon; cellulosic fillers (wood flour, cork and shell flour); calcium carbonate (chalk, limestone, and precipitated calcium carbonate); metal flakes; metallic oxides (aluminum, beryllium oxide and magnesia); metallic powders (aluminum, bronze, lead, stainless steel and zinc); polymers (comminuted polymers and elastomer-plastic blends); silica products (diatomaceous earth, novaculite, quartz, sand, tripoli, fumed colloidal silica, silica aerogel, wet process silica); silicates (asbestos, kaolimite, mica, nepheline syenite, talc, wollastonite, aluminum silicate and calcium silicate); and inorganic compounds such as barium ferrite, barium sulfate, molybdenum disulfide and silicon carbide.

The above mentioned materials, including fillers, are more fully described in Modern Plastics Encyclopedia, ibid, and which publication is incorporated herein (in toto) by reference.

The amount of the above described materials employed in the present invention compositions can be any quantity which will not substantially adversely effect the desired results derived from the present invention compositions. Thus, the amount used can be zero (0) percent, based on the total weight of the composition, up to that percent at which the composition can still be classified as a plastic. In general, such amount will be from about 0 to about 75% and specifically from about 1 to about 50%.

The halogenated aryl compounds can be incorporated into the acrylonitrile-butadiene-styrene at any processing stage in order to prepare the present invention compositions. In general, this is undertaken prior to fabrication either by physical blending or during the process of forming acrylonitrile-butadiene-styrene per se. Where one so desires, the halogenated aryl compounds may be micronized into finely divided particles prior to incorporation into the acrylonitrile-butadiene-styrene.

EXAMPLE I

An ABS plastic material, (Marbon TP-2098, a product of Marbon Division, Borg-Warner Corporation, Washington, West Virginia and made in the manner disclosed and claimed in U.S. Pat. No. 3,238,275 issued on Mar. 1, 1966 and containing antioxidants, lubricants, releasing agents and titanium dioxide pigment) is utilized as the base resin in order to prepare 26 formulations (plastic compositions). With the exception of formulation No. 1, the particular halogenated aryl compound (and the antimony trioxide enhancing agent where indicated) is incorporated into the plastic by adding both to a Brabender mixer ("Plastic-Corder," Torque Rheometer, Model PLV-150, C. W. Brabender Instruments Inc., South Hackensack, N.J.). The mixer is equipped with a pair of roller type blades positioned within a head provided with heat transfer means.

The resultant mixture is heated to about 245° C.; at this temperature, it is in a molten state. The percentages by weight of each component utilized in the respective formulations are listed in Table II. Each formulation is discharged from the mixer and upon cooling solidifies and is ground into chips. The chips are subjected to compression molding in a Wabash press by placing said chips between two platens, the bottom of which contains four equal size depressions three inches by 5 inches by ⅛ inch deep. The top platen is then placed over the bottom platen and heat transfer means supplied thereto in order to melt said chips and thus provide solid samples (after cooling) for testing.

Portions of the solid samples of each respective formulation (Nos. 1-26) prepared according to the above described procedure are then subjected to two different standard flammability tests, i.e. UL 94 and ASTM D-2863-70. The UL 94 is, in general, the application of a burner to a test specimen (strip) for a certain period of time and observation of combustion, burning, and extinguishment. This procedure is fully set forth in Underwriters' Laboratories bulletin entitled UL 94, Standard for Safety, First Edition, September 1972 and which is incorporated herein by reference. ASTM No. D-2863-70 is a flammability test which correlates the flammability of a plastic specimen to the available oxygen in its immediate environment; this correlation is stated as an oxygen Index, O.I., level predicated upon the percent oxygen in the gaseous medium which is required to just provide a steady state of continuous burning of the plastic specimen. This ASTM method is fully described in 1971 Annual Book of ASTM Standards — Part 27, published by the American Society For Testing and Materials, 1916 Race Street, Philadelphia, Pa.; this publication is to be considered as incorporated (in toto) herein by reference.

The results of these flammability tests are shown in Table II.

7, 9, 11, 13, 15, 17, 19, 21, 23, 25 and 26. The highest UL 94 ratings and significantly higher O.I. values (4.5–18.0% increase) are obtained.

EXAMPLE II

Example I is repeated twice; once using a 10% halogenated aryl compound level and 3% $Sb_2O_3$ level and secondly, 20 and 10% levels respectively. At the 10%/3% level, the O.I. values and UL 94 ratings are slightly lower than the 15%/5% level of Example I. At the 20%/10% levels, the O.I. values and UL 94 ratings are slightly higher but basically the same as those obtained using 15%/5% level.

EXAMPLE III

Portions of the solid samples of Formulation Nos.

TABLE II

FLAMMABILITY DATA FOR ABS PLASTIC COMPOSITIONS CONTAINING HALOGENATED ARYL COMPOUNDS

| FORMULATION NO. | HALOGENATED ARYL COMPOUND NO. | % | ENHANCING AGENT $Sb_2O_3$, % | OXYGEN INDEX % | UL 94 |
|---|---|---|---|---|---|
| 1. | — | 0 | 0 | 18.5 | SB |
| 2. | 1 | 15 | 0 | 19.0 | SB |
| 3. | 1 | 15 | 5 | 23.0 | SB |
| 4. | 2 | 15 | 0 | 20.5 | SB |
| 5. | 2 | 15 | 5 | 32.0 | SE-O |
| 6. | 3 | 15 | 0 | 21.0 | SB |
| 7. | 3 | 15 | 5 | 34.0 | SE-O |
| 8. | 4 | 15 | 0 | 21.5 | SB |
| 9. | 4 | 15 | 5 | 33.0 | SE-O |
| 10. | 32 | 15 | 0 | 23.5 | SB |
| 11. | 32 | 15 | 5 | 35.0 | SE-O |
| 12. | 37 | 15 | 0 | 20.5 | SB |
| 13. | 37 | 15 | 5 | 28.5 | SB-1 |
| 14. | 65 | 15 | 0 | 21.0 | SB |
| 15. | 65 | 15 | 5 | 27.5 | SB-1 |
| 16. | 79 | 15 | 0 | 21.5 | SB |
| 17. | 79 | 15 | 5 | 28.0 | SB-1 |
| 18. | 122 | 15 | 0 | 21.0 | SB |
| 19. | 122 | 15 | 5 | 27.0 | SB-1 |
| 20. | 143 | 15 | 0 | 24.0 | SB |
| 21. | 143 | 15 | 5 | 36.5 | SE-0 |
| 22. | 159 | 15 | 0 | 21.0 | SB |
| 23. | 159 | 15 | 5 | 28.0 | SE-0 |
| 24. | 181 | 15 | 0 | 20.5 | SB |
| 25. | 181 | 15 | 5 | 27.0 | SE-1 |
| 26. | 205 | 15 | 5 | 34.0 | SE-0 |

Referring to Table II, the halogenated aryl compound number relates to the structural formulae heretofor set forth in Table I; a difference of 2% in the Oxygen Index values is considered significant; and the UL 94 values are on a graduated scale wherein the highest degree to lowest degree of the flame retardancy is respectively SE-0, SE-1, SE-2, SB and Burns.

The results shown in Table II demonstrate the unique effectiveness of these halogenated aryl compounds as flame retardants for ABS. Specifically, formulation No. 1 (the control) had a O.I. of 18.5 and UL 94 value of SB. In Nos. 2, 4, 6, 8, 10, 12, 14, 16, 18, 20, 22 and 24, the use of the particular halogenated aryl compound results in a significant increase (0.5–5.0%) in fire retardancy as measured by O.I. (While these formulations also had a SB rating, UL 94, the individual U L rating has a wide range of values and thus the O.I. number is, in this case, more indicative of increased flame retardancy).

The use of an enhancing agent such as $Sb_2O_3$ to promote a cooperative effect between such agent and the halogenated aryl compound is fully demonstrated via the results obtained from testing formulation Nos. 3, 5, 1–26 prepared according to the above described procedure of Example I are subjected to the following ASTM tests in order to ascertain other properties of the resultant plastic composition:

1. Tensile Strength (at break) : ASTM Test No. D638-61T;
2. Flexural Strength : ASTM Test No. D790-63;
3. Flexural Modulus : ASTM Test No. D790-63;
4. Notched Izod Impact : ASTM Test No. D256-56; and
5. Heat Distortion Temperature (HDT) : ASTM Test No. D648-56.

Each of the aforementioned ASTM Tests are standard tests in the art and are utilized collectively in order to ascertain the efficacy of a polymeric system as an overall flame retarded composition for commercial application. All of these ASTM Tests are to be considered as incorporated herein by reference.

The results of these ASTM tests show that the physical properties of the present invention compositions are basically the same (except O.I. and UL 94 values) as the plastic material without the flame retardant (i.e. formulation No. 1). Thus, there is no substantial adverse efect on the physical properties of the plastic material when the novel compounds are incorporated therein.

EXAMPLE IV

The procedure of Examples I and III are repeated except that the enhancing agent used is zinc borate instead of $Sb_2O_3$. Substantially the same results are obtained using zinc borate as those obtained using $Sb_2O_3$.

EXAMPLE V

Strip samples of each of Formulation Nos. 1 through 26 Table II, are subjected to light stability tests via the use of a "Weather-Ometer," model 25/18 W. R., Atlas Electrical Devices Company, Chicago, Illinois. Utilizing an operating temperature of 145° F and a 50% relative humidity, each strip is subjected to 200 hours of "simulated daylight" via the use of a carbon arc. The results show that after 200 hours, there is no significant discoloration in any strip tested and which demonstrates that the present invention compositions are highly resistant to deterioration by light.

EXAMPLE VI

Samples of each of Formulation Nos. 1 through 26 Table II, are subjected to temperature (thermal) stability tests via the use of thermal gravimetric analysis (TGA). This test employed the use of a "Thermal Balance," model TGS-1, Perkin-Elmer Corporation, Norwalk, Connecticut and an electrical balance, Cahn 2580 model, Cahn Instrument Company, Paramount, California. The results of these tests show that the halogenated aryl compounds containing Formulations had more than adequate stability for melt processing and subsequent heat aging (i.e. high temperature applications) and thus demonstrating that the particular halogenated aryl compounds are quite compatible with the plastic material. The halogenated aryl compound stability thus aids in providing sufficient flame retardancy at the plastic decomposition temperature. This test also demonstrates that these compounds do not exhibit migration.

In view of the foregoing Examples and remarks, it is seen that the plastic compositions, which incorporate these compounds, possess characteristics which have been unobtainable in the prior art. Thus, the use of these compounds in the above described plastic material as flame retardants therefor is quite unique since it is not possible to predict the effectiveness and functionality of any particular material in any polymer system until it is actively undergone incorporation therein and the resultant plastic composition tested according to various ASTM Standards. Furthermore, it is necessary, in order to have commercial utility, that the resultant flame retarded plastic composition possess characteristics such as being non-toxic. Use of these compounds in the plastic material has accomplished all of these objectives.

The above examples have been described in the foregoing specification for the purpose of illustration and not limitation. Many other modifications and ramifications will naturally suggest themselves to those skilled in the art based on this disclosure. These are intended to be comprehended as within the scope of this invention.

What is claimed is:

1. A plastic composition containing acrylonitrile-butadiene-styrene polymer having incorporated therein a flame retardant which is a halogenated aryl compound having the formula:

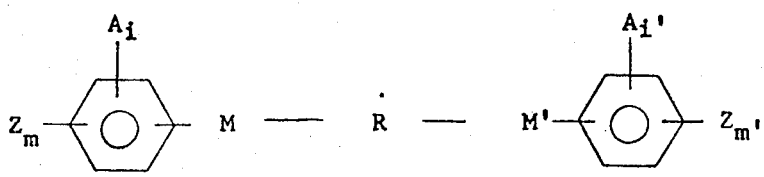

wherein Z is selected from the group consisting of bromine or chlorine; $m$ and $m'$ are integers having a value of 1–5; $i$ and $i'$ are integers having a value of 0–2; M and M' are each independent and are selected from the group consisting of oxygen, nitrogen or sulfur with the proviso that M and M' cannot concurrently be oxygen in both cases and where M and/or M' is nitrogen, the formula is $$-\overset{H}{\underset{}{N}}-,$$

A is selected from the group consisting of chlorine, cyano, nitro, lower alkoxy, lower alkyl, fluorine, dialkylamino, phenyl, halo-phenyl, benzyl, or halo-benzyl; and R is selected from the group consisting of
(a) alkylene group having from one to six carbon atoms
(b) $CH_2—CH(OH)—CH_2$
(c) $CH_2—CH(CH_2OH)—CH_2$
(d) $(CH_2)_w— O— (CH_2)_w$
where $w = 1-6$
(e)

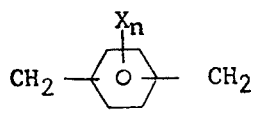

where
$X = H, Cl, Br$
$n = 4$
(f) $CH_2— C(O)— CH_2$
(g)

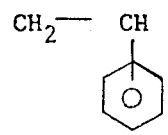

(h)

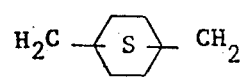

where S = saturated ring

2. The composition as set forth in claim 1 wherein *i* and *i'* are both 0.

3. The composition as set forth in claim 1 wherein *i* and *i'* are both 1.

4. The composition as set forth in claim 1 wherein *i* and *i'* are both 2.

5. A plastic composition containing acrylonitrile-butadiene-styrene polymer having incorporated therein a flame retardant which is a halogenated aryl compound having the formula:

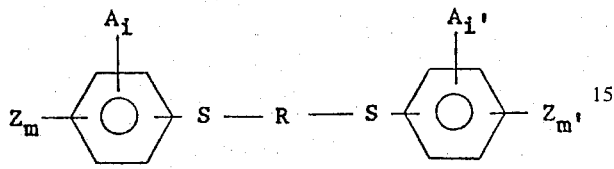

wherein Z is selected from the group consisting of bromine or chlorine; *m* and *m'* are integers having a value of 1–5; *i* and *i'* are integers having a value of 0–2; A is selected from the group consisting of chlorine, cyano, nitro, lower alkoxy, lower alkyl, fluorine, dialkylamino, phenyl, halo-phenyl, benzyl, or halo- benzyl; and R is selected from the group consisting of (a) alkylene group having from one to six carbon atoms
(b) $CH_2$—CH(OH)—$CH_2$
    $CH_2$—CH($CH_2OH$)—$CH_2$
(d) $(CH_2)_w$—O—$(CH_2)_w$
    where $w = 1$–6
(e)

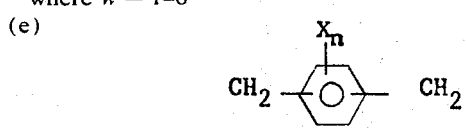

where
    X = H, Cl, Br
    n = 4
(f) $CH_2$—C(O)—$CH_2$
(g)

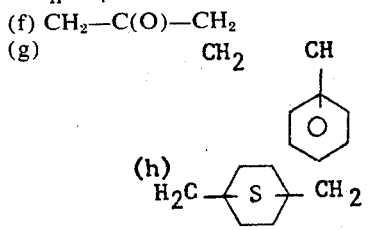

where S = saturated ring

6. The composition as set forth in claim 5 wherein *i* and *i'* are both 0.

7. The composition as set forth in claim 5 wherein *i* and *i'* are both 1.

8. The composition as set forth in claim 5 wherein *i* and *i'* are both 2.

9. The composition as set forth in claim 6 wherein R is an alkylene group having from 1 to 6 carbon atoms.

10. A plastic composition containing acrylonitrile-butadiene-styrene polymer having incorporated therein a flame retardant which is a halogenated aryl compound having the formula:

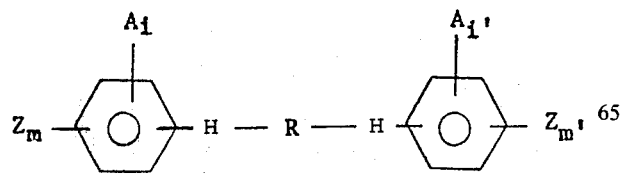

wherein Z is selected from the group consisting of bromine or chlorine; *m* and *m'* are integers having a value of 1–5; *i* and *i'* are integers having a value of 0–2; A is selected from the group consisting of chlorine, cyano, nitro, lower alkoxy, lower alkyl, fluorine, dialkylamino, phenyl, halo-phenyl, benzyl, or halobenzyl; and R is selected from the group consisting of (a) alkylene group having from one to six carbon atoms
(b) $CH_2$—CH(OH)—$CH_2$
(c) $CH_2$—CH($CH_2OH$)—$CH_2$
(d) $(CH_2)_w$—O—$(CH_2)_w$
    where $w = 1$–6
(e)

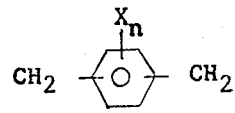

where
    X = H, Cl, Br
    n = 4
(f) $CH_2$—C(O)—$CH_2$
(g)

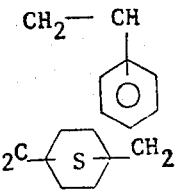

where S = saturated ring

11. The composition as set forth in claim 10 wherein *i* and *i'* are both 0.

12. The composition as set forth in claim 10 wherein *i* and *i'* are both 1.

13. The composition as set forth in claim 10 wherein *i* and *i'* are both 2.

14. The composition as set forth in claim 11 wherein R is an alkylene group having from 1 to 6 carbon atoms.

15. A plastic composition containing acrylonitrile-butadiene-styrene polymer having incorporated therein a flame retardant which is a halogenated aryl compound having the formula:

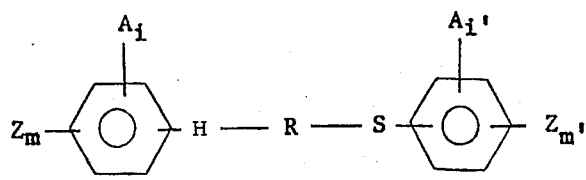

wherein Z is bromine or chlorine, *m* and *m'* are integers having a value of 1–5, *i* and *i'* are integers having a value of 0–2; A is chlorine, cyano, nitro, lower alkoxy, lower alkyl, fluorine, dialkylamino, phenyl, halo-phenyl, benzyl, or halo- benzyl; and R is selected from the group consisting of (a) alkylene group having from one to six carbon atoms
(b) $CH_2$—CH(OH)—$CH_2$
(c) $CH_2$—CH($CH_2OH$)—$CH_2$
(d) $(CH_2)_w$—O—$(CH_2)_w$
    where $w = 1$–6
(e)

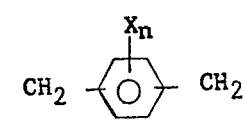

where
X = H, Cl, Br
n = 4

(f) $CH_2-C(O)-CH_2$ (g) 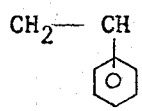

(h) 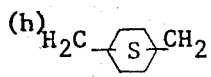

where S = saturated ring

16. The composition as set forth in claim 15 wherein $i$ and $i'$ are both 0.

17. The composition as set forth in claim 15 wherein $i$ and $i'$ are both 1.

18. The composition as set forth in claim 15 wherein $i$ and $i'$ are both 2.

19. The composition as set forth in claim 16 wherein R is an alkylene group having from 1 to 6 carbon atoms.

20. A plastic composition containing acrylonitrile-butadiene-styrene polymer having incorporated therein a flame retardant which is a halogenated aryl compound having the formula:

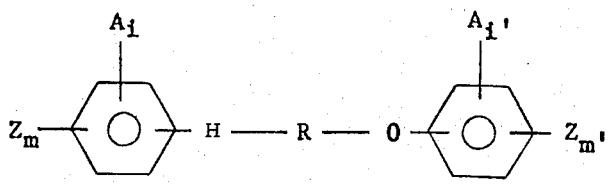

wherein Z is bromine or chlorine, $m$ and $m'$ are integers having a value of 1–5; $i$ and $i'$ are integers having a value of 0–2; A is chlorine, cyano, nitro, lower alkoxy, lower alkyl, fluorine, dialkylamino, phenyl, halophenyl, benzyl, or halo- benzyl; and R is selected from the group consisting of (a) alkylene group having from one to six carbon atoms
(b) $CH_2-CH(OH-CH_2$
(c) $CH_2-CH(CH_2OH)-CH_2$
(d) $(CH_2)_w-O-(CH_2)_w$
wherein $w = 1-6$ (e) 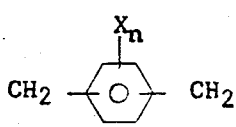

where
X = H, Cl, Br
n = 4

(f) $CH_2-C(O)-CH_2$ (g) 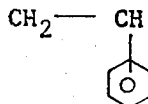

(h) 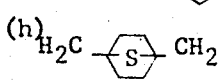

where S = saturated ring

21. The composition as set forth in claim 20 wherein $i$ and $i'$ are both 0.

22. The composition as set forth in claim 20 wherein $i$ and $i'$ are both 1.

23. The composition as set forth in claim 20 wherein $i$ and $i'$ are both 2.

24. The composition as set forth in claim 21 wherein R is an alkylene group having 1 to 6 carbon atoms.

25. A plastic composition containing acrylonitrile-butadiene-styrene polymer having incorporated therein a flame retardant which is a halogenated aryl compound having the formula:

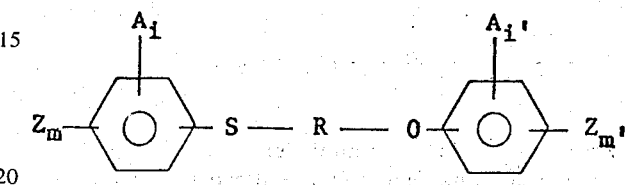

wherein Z is bromine or chlorine, $m$ and $m'$ are integers having a value of 1–5; $i$ and $i'$ are integers having a value of 0–2; A is chlorine, cyano, nitro, lower alkoxy, lower alkyl, fluorine, dialkylamino, phenyl, halophenyl, benzyl, or halo- benzyl; and R is selected from the group consisting of (a) alkylene group having from one to six carbon atoms
(b) $CH_2-CH(OH)-CH_2$
(c) $CH_2-CH(CH_2OH)-CH_2$
(d) $(CH_2)_w-O-(CH_2)_w$
where $w = 1-6$ (e) 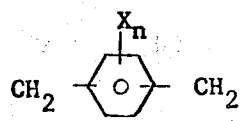

where
X = H, Cl, Br
n = 4

(f) $CH_2-C(O)-CH_2$ (g) 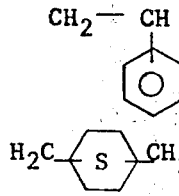

(h) 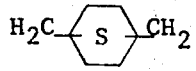

where S = saturated ring

26. The composition as set forth in claim 25 wherein $i$ and $i'$ are both 0.

27. The composition as set forth in claim 25 wherein $i$ and $i'$ are both 1.

28. The composition as set forth in claim 25 wherein $i$ and $i'$ are both 2.

29. The composition as set forth in claim 26 wherein R is an alkylene group having 1 to 6 carbon atoms.

* * * * *

UNITED STATES PATENT OFFICE
CERTIFICATE OF CORRECTION

PATENT NO. : 3,892,710
DATED : July 1, 1975
INVENTOR(S) : Arnold L. Anderson and Robert J. Nulph It is certified that error appears in the above-identified patent and that said Letters Patent are hereby corrected as shown below:

Claim 10, column 17, line 65, (being the first structural formula of said claim) delete the formula as shown and substitute therefore the following:

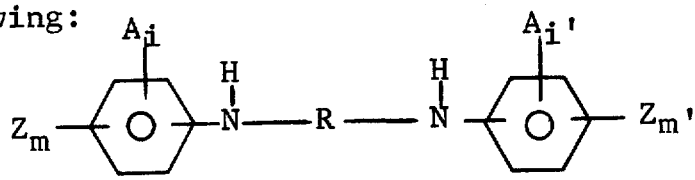

Claim 15, column 18, line 50, (being the first structural formula of said claim) delete the formula as shown and substitute therefore the following:

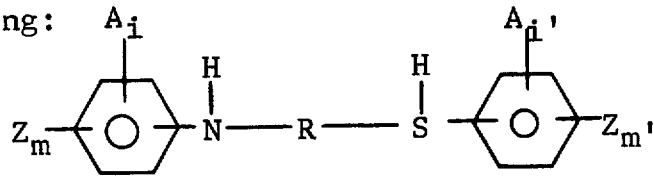

(continued on page 2)

UNITED STATES PATENT OFFICE
CERTIFICATE OF CORRECTION

PATENT NO. : 3,892,710
DATED : July 1, 1975
INVENTOR(S) : Arnold L. Anderson and Robert J. Nulph It is certified that error appears in the above-identified patent and that said Letters Patent are hereby corrected as shown below:

Claim 20, column 19, line 30, (being the first structural formula of said claim) delete the formula as shown and substitute the following:

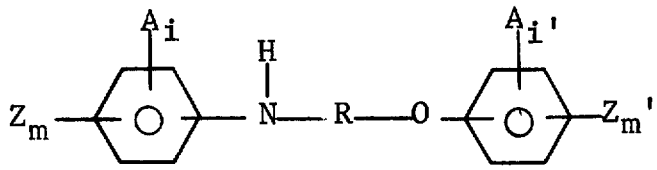

Signed and Sealed this seventh Day of October 1975

[SEAL]

Attest:

RUTH C. MASON
*Attesting Officer*

C. MARSHALL DANN
*Commissioner of Patents and Trademarks*